E. MURRAY.
LOCK NUT.
APPLICATION FILED OCT. 7, 1918.

1,334,389.

Patented Mar. 23, 1920.

WITNESS:
Mary S. Hugill

INVENTOR.
Edward Murray
BY
Charles E. Wiener
ATTORNEY.

UNITED STATES PATENT OFFICE.

EDWARD MURRAY, OF DETROIT, MICHIGAN, ASSIGNOR, BY DIRECT AND MESNE ASSIGNMENTS, TO DETROIT AUTOMATIC LOCK NUT COMPANY, OF DETROIT, MICHIGAN, A CORPORATION OF MICHIGAN.

LOCK-NUT.

1,334,389.  Specification of Letters Patent.  Patented Mar. 23, 1920.

Application filed October 7, 1918. Serial No. 257,113.

*To all whom it may concern:*

Be it known that I, EDWARD MURRAY, a citizen of the United States, residing at Detroit, county of Wayne, State of Michigan, have invented a certain new and useful Improvement in Lock-Nuts, and declare the following to be a full, clear, and exact description of the same, such as will enable others skilled in the art to which it pertains to make and use the same, reference being had to the accompanying drawings, which form a part of this specification.

This invention relates to self-locking nuts, and its object is to provide a simple and inexpensive construction involving the use of a binding roller engaging the screw threads of a bolt to prevent accidental movement or loosening of the nut thereon and still allow easy or unrestricted forward or tightening movement of the nut on the bolt. A further object is to provide a binding roller for the purpose stated that is spring-pressed in a recess provided at one side of the bolt aperture in the nut, and to provide a cap retaining the roller in position to prevent accidental displacement and the cap member being prevented from displacement by the bolt. A further object is to provide a cap member for the said roller recess having a depressible portion adapted to be forced into the recess to force the roller backward in the recess out of binding engagement with the bolt threads. These and other objects and the several novel features of the invention are hereinafter more fully described and claimed and shown in the accompanying drawings in which—

Figure 1:
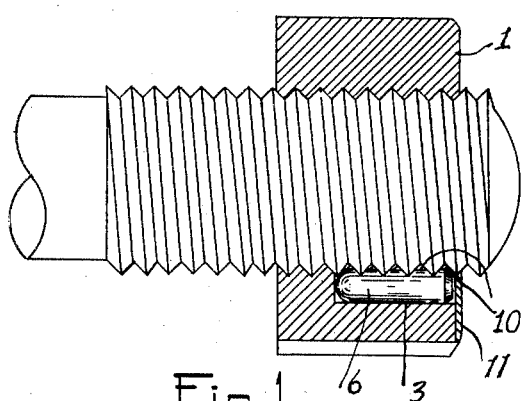
Figure 1 is a longitudinal section of a bolt showing my improved lock nut thereon.
Figure 2:
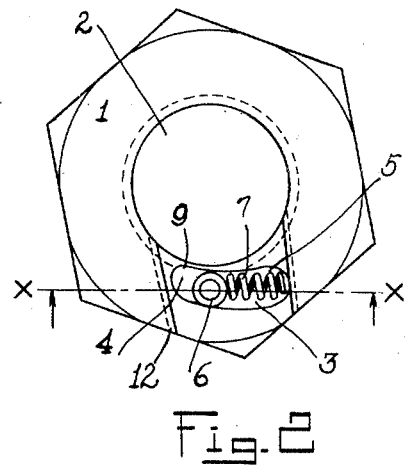
Fig. 2 is a plan view of the nut showing the binding roller and spring for holding the same in position.
Figure 3:
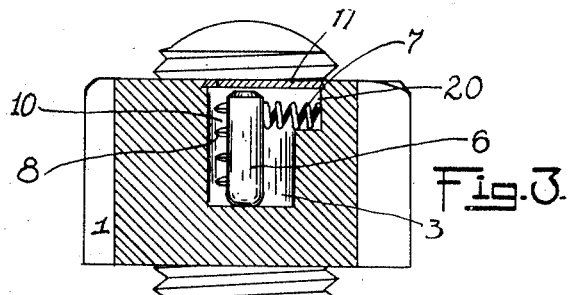
Fig. 3 is a section through the nut taken on line x—x of Fig. 2.

The device is adaptable for use on bolts having threads of various types, and the nut and binding parts may be made in various sizes to accord with the different sizes of bolts. The nut 1 is provided with a central aperture 2, and at one side of this aperture is provided a recess 3, a portion of which recess at the inner end 4 is concentric with the nut aperture, and the rear part of the recess 5 being formed eccentric to or at a tangent to the curved forward end of the recess. The recess extends downward into the nut, as will be understood from Figs. 1 and 3, and is of a depth slightly greater than the length of the roller 6 mounted therein. This roller is held toward the forward end 4 of the recess by means of a coiled spring 7 positioned in the part 20 of the recess, provided therefor. The wall of the recess at the inner side of the forward end is less in thickness than the depth of the thread so that the threads of the bolt when inserted in the nut extend through the interstices 8 between the threads and engage the roller. By forming this wall 9 between the nut aperture and the recess of such thickness that the threading of the nut aperture cuts through the wall of the recess several bars 10 are provided at the forward end of the recess that prevent the roller from dropping out of the recess when the nut has been withdrawn from the bolt. By the eccentric position of the recess 3 the nut will readily turn onto the bolt in a tightening operation, but on attempted reverse rotation thereof and by reason of engagement of the threads of the bolt with the roller, the roller tends to draw toward the forward end 4 of the recess and binds the nut on the bolt preventing reverse rotation.

The recess is open at the upper surface of the nut and to prevent the roller from dropping out I have provided a cap member 11 for the recess. The face of the nut at the mouth of the recess is cut to a depth equal to the thickness of the cap and the opposite edges of the groove thus formed are undercut as indicated at 12. The corresponding edges 13 of the cap are also shaped to fit this undercut portion 12. These edges 13 are formed at an angle one to the other, as may be understood from the drawing, being widest at the inner or aperture side of the cap and narrower at the outer side so that the cap must be inserted from the aperture of the nut and, when the bolt is in position, the cap is prevented from accidental displacement and the roller and spring are thus held within the recess.

Figure 4:
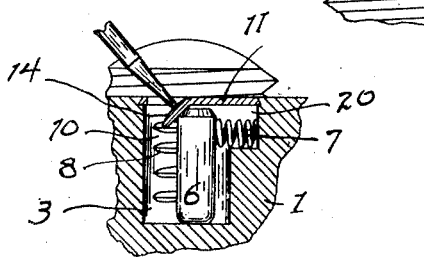
Fig. 4 is a similar section showing the mode of forcing the roller out of binding position.
Figure 5:
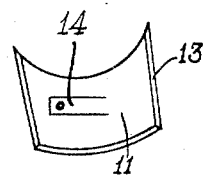
Fig. 5 is a plan view of the cap member used for retaining the roller in its recess.

In order to remove the nut from the bolt it is necessary to press the roller back toward the large end 5 of the recess to force it out of contact with the threads of the bolt. For this purpose the cap 11 is provided with a depressible lip 14 formed by splitting the metal of the cap and this lip may be depressed into the recess forward of the roller 6 in the manner indicated in Fig. 4. The cap is made of soft material, and this lip when once depressed as indicated will effectually hold the roller in retracted position allowing ready removal of the nut, and after removal of the nut the lip 14 may be bent upward by introducing a pointed instrument in the aperture normally occupied by the lip and bending it back practically to normal position. The cap may then be removed if desired, but after replacement of the lip 14 to approximately normal position the nut is again ready for use.

The roller is formed of hardened material to reduce wear to a minimum and may be used practically indefinitely enabling a nut to be used without material injury to the parts or loss of function thereof.

By the arrangement of the recess so that only the points of the threads of the bolt enter the recess and providing a cap for the recess as described, the roller and spring therefor are maintained in place with little or no likelihood of loss or displacement of the several parts, and the nut is at all times in condition for use, and the necessity of use of jam nuts, spring washers or devices to prevent accidental displacement of the nut is avoided.

Having thus briefly described my invention, what I claim is—

1. A self-locking nut consisting of a nut having a threaded aperture for fitting a threaded bolt and a recess formed at one side of the said aperture, the recess being eccentric to the aperture, the wall between the forward end of the recess and the aperture being less than the depth of the thread allowing the threads of the bolt to project into the aperture at said forward end, a spring-pressed roller in the recess, a groove formed axially across the face of the nut having undercut edges at opposite sides, said edges being at an angle one toward the other and being the greatest distance apart at the aperture, and a cap having tapered edges for fitting the groove and held in position in the groove by the bolt.

2. A self-locking nut consisting of a nut having a threaded aperture for fitting a threaded bolt and an eccentrically positioned recess formed at one side of the aperture, the wall between the forward end of the recess being less than the depth of the thread to allow the threads of the bolt to project into the aperture at said forward end, the rear end of the aperture being greater in width than the forward end and being at a greater distance from the aperture, a spring-pressed roller in the said recess, a cap member for the recess having a lip formed by slitting the material, said lip being adapted to be turned downward into the recess to press the roller toward the rear end thereof to free the nut on the bolt.

3. A self-locking nut consisting of a nut having a threaded aperture for fitting a threaded bolt, an eccentric recess formed at one side of the aperture, the recess being so positioned that the threads of the bolt extend thereinto at one end, a spring-pressed roller for bindingly engaging the threads of the bolt on turning the nut in one direction and releasing from binding engagement on rotation in the other direction, a groove formed axially across the face of the nut at the mouth of the recess, the edges of the groove being undercut and positioned at an angle one to the other, being the greatest distance apart at the aperture, a cap member fitting thereinto having undercut edges fitting the edges of the groove and held from removal by the bolt, and a lip formed by slitting of the material of the cap adapted to be pressed downward in the recess to press the roller out of binding contact with the threads of the bolt.

In testimony whereof I sign this specification.

EDWARD MURRAY.